May 25, 1937.                H. M. STOLLER ET AL                    2,081,411
                               SYNCHRONOUS MOTOR
                   Original Filed July 21, 1933    2 Sheets-Sheet 1
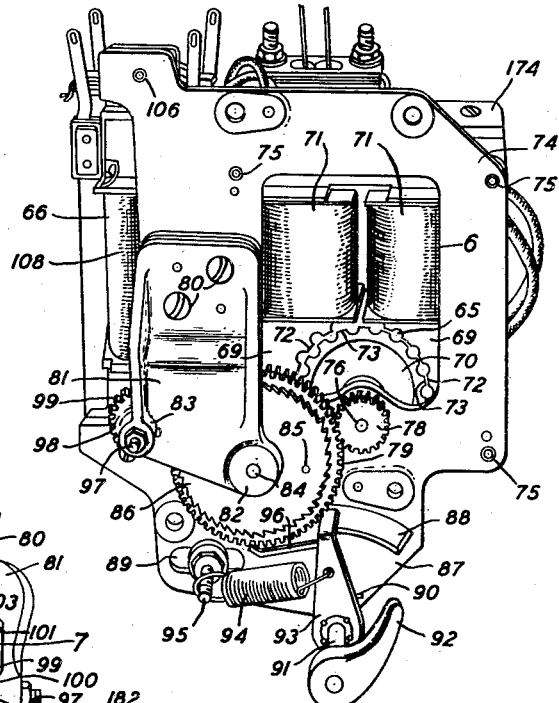
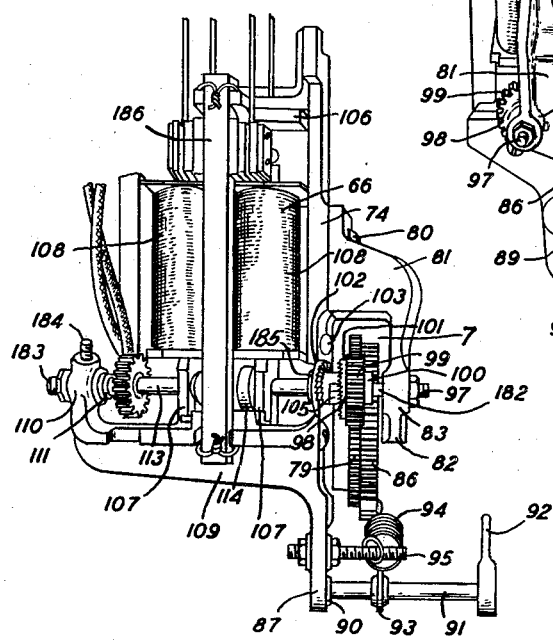
INVENTORS: H.M. STOLLER
           E.R. MORTON
BY
   J. MacDonald
        ATTORNEY May 25, 1937.   H. M. STOLLER ET AL   2,081,411
SYNCHRONOUS MOTOR
Original Filed July 21, 1933    2 Sheets-Sheet 2

INVENTORS
H. M. STOLLER
E. R. MORTON
BY J. MacDonald
ATTORNEY

Patented May 25, 1937

2,081,411

UNITED STATES PATENT OFFICE 2,081,411

SYNCHRONOUS MOTOR

Hugh M. Stoller, Mountain Lakes, N. J., and
Edmund R. Morton, New York, N. Y., assignors
to Bell Telephone Laboratories, Incorporated,
New York, N. Y., a corporation of New York Original application July 21, 1933, Serial No. 681,460. Divided and this application September 21, 1935, Serial No. 41,518

2 Claims. (Cl. 172—275)

This invention relates to timing devices and more particularly to a timing device for indicating elapsed time for an event, or the time taken by a moving obect in traveling from one predetermined point to another. The invention while not necessarily limited to such use is particularly adapted for use in timing races or other sports events. Certain features which are subsequently described and which constitute this invention are improvements over the timing device disclosed in G. T. Kirby application Serial No. 620,437.

The object of this invention, therefore, is to provide improved means for accurately determining the time taken for a race or other event.

The improvements constituting this invention reside in a synchronous motor, the motor being employed to drive a chronometer.

A feature of this invention resides in the magnetic structure of the motor.

The invention may be used in conjunction with a chronometer combined with a motion picture camera when it is desired to have pictures of an event and a record of the elapsed time appear on the same motion picture film, or it may be used with a chronometer exclusive of the camera when only time records are required.

A clutch forming the subject-matter of our Patent 2,019,638, issued November 5, 1935 and of which this application is a division is provided to couple the synchronous motor to the chronometer.

In the drawings:

Fig. 1 is a view in perspective of the synchronous motor combined in a unitary structure with the clutch;

Fig. 4 is a view in perspective of the clutch including a polarized clutch operating magnet.

Figure 2:
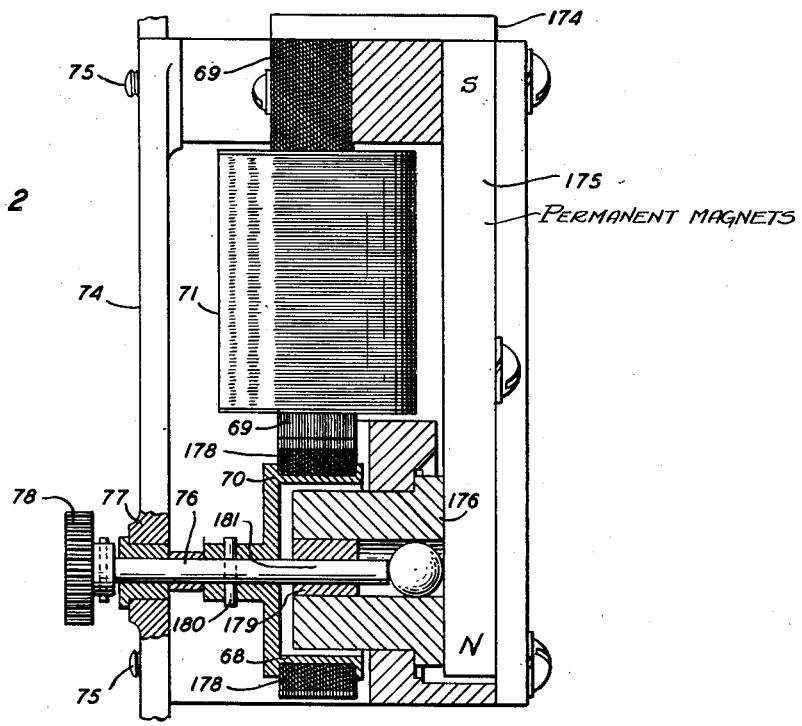
Fig. 2 is a side elevational view of the synchronous motor, partly in section.

In timing races and other events with this apparatus the synchronous motor is started some time before the beginning of the event. A starting signal is then given to start the event. When the starting signal is given the clutch is operated to connect the synchronous motor to the chronometer. The chronometer is continued in operation from the beginning of the event until a contestant or a predetermined number of contestants has crossed a certain line. Some time before this predetermined line is crossed by a contestant or contestants, lamps to illuminate the dials of the chronometer are lighted and the motion picture camera is brought into operation. Pictures are then taken of the event and the chronometer dials. In each frame of the motion picture film, therefore, there appears an image of the contestant, or contestants as the line is approached or crossed and a picture of the chronometer dials showing them in their relative positions with respect to some predetermined point at the time the picture was taken.

To more clearly point out the improvements in which this invention resides, reference will now be had to the drawings.

The chronometer is driven by means of the synchronous motor 6 which is combined with the clutch 7 and the polarized clutch operating magnet 66 in the unitary structure as shown in Figs. 1 and 4. The synchronous motor 6 is a non-self-starting synchronous motor and comprises a set of U-shaped laminated pole-pieces 69, a set of permanent magnets 175, shown in Figs. 2 and 3, a cylindrical rotor 70 and a pair of operating coils 71 to alternately affect the magnetism of the pole-pieces 69. The free ends of the pole-pieces 69 are machined out at their adjacent inward faces to provide a cylindrical aperture 65 to accommodate the rotor 70. The pole-pieces 69 are provided with arcuately arranged protuberances 72 which project into the magnetic field. Operating within the cylindrical aperture 65 formed between the free ends of pole-pieces 69 is the cylindrical rotor 70 which has peripheral projections 73 extending radially toward the protuberances 72 of the pole-pieces 69. The number and spacing of the proturberances 72 of the pole-pieces 69 and the number and spacing of the peripheral projections 73 on the rotor 70 are so arranged that when the peripheral projections 73 on one side of the rotor 70 are in alignment with the inwardly projecting protuberances 72 of one pole-piece, the peripheral projections 73 on the other side of the rotor 70 are not in alignment with the inwardly projecting protuberances 72 of the other pole-piece. Connected to the closed end of the laminated pole-pieces 69 by means of a plate 174 is a set of bar magnets 175 which are permanently magnetized. The bar magnets 175 are arranged in parallel and extend parallel to the leg portions of the laminated pole-pieces 69. The south pole ends of the bar magnets 175 terminate in the plate 174 and the north poles of the bar magnets extend downward toward the free ends of the laminated pole-pieces 69. Attached to the north pole ends of the bar magnets 175 is a plug member 176 of magnetic material. The cylindrical rotor 70 comprises a cup member 68 on the periphery of which is secured a ring 178 of magnetic material. On the periphery of the ring 178 are the projections 73 which extend radially of the rotor 70 toward the pole-pieces 69. The plug 176 is provided with a centrally located sleeve bearing 179 adapted to receive a shaft 76 which is secured at 180 to the bottom of the cup member 68. The shaft 76 extends inward within the center of the cup member 68 to form a pin portion 181 which is journalled in the sleeve bearing 179 of the plug 176. The shaft 76 projects beyond the bottom of the cup member 68.

The plug 176 forms a central north pole end of the stator assembly of the motor. The leg portions of the U-shaped pole-pieces 69 form south poles on opposite sides of the rotor. The magnetic circuit is therefore divided and may be traced from the north pole ends of the bar magnets 175 through the plug 176, across the small air-gap between the periphery of the plug 176 and the inner wall of the cup 70, through the cup 70 to the laminated ring of magnetic material 178 on the outside of the cup, through the peripheral projections 73 of the ring 178, across an air-gap between the ring 178 and the leg portions of the U-shaped pole-pieces 69, through the pole-pieces 69 by way of the protuberances 72 and thence through the plate 174 to the south pole ends of the bar magnets 175. Each leg of the U-shaped pole-piece member by reason of its connection with the south pole ends of the bar magnets forms in normal condition a permanently magnetized south pole. An operating coil 71 is provided on each leg portion of the U-shaped member. The coils 71 are connected to a suitable source of alternating current. When the coils 71 are energized the magnetic flux in one of the legs of the U-shaped member is partially neutralized whereas in the opposite leg of the U-shaped member the flux is reenforced. This reduces the magnetic attraction between the projecting protuberances 72 of the leg portion of the U-shaped member and the peripheral projections 73 on one side of the rotor 70 and increases the magnetic attraction between the projecting protuberances 72 and the peripheral projections 73 on the other side of the rotor 70 thereby releasing the aligning magnetic force between the protuberances 72 and projections 73 on the one side of the rotor and increasing the magnetic pull between the protuberances 72 and projections 73 on the other side of the rotor 70 to bring the protuberances 72 and projections 73 on the last-mentioned side into alignment. The rotation originally imparted to the rotor 70, therefore, is continued by the alternate changes in the magnetic structure caused by the alternating current applied to the operating coils 71. While a plurality of protuberances 72 are shown on each leg portion of the U-shaped member a single protuberance 72 on each leg portion might be found adequate for the purpose.

Figure 3:
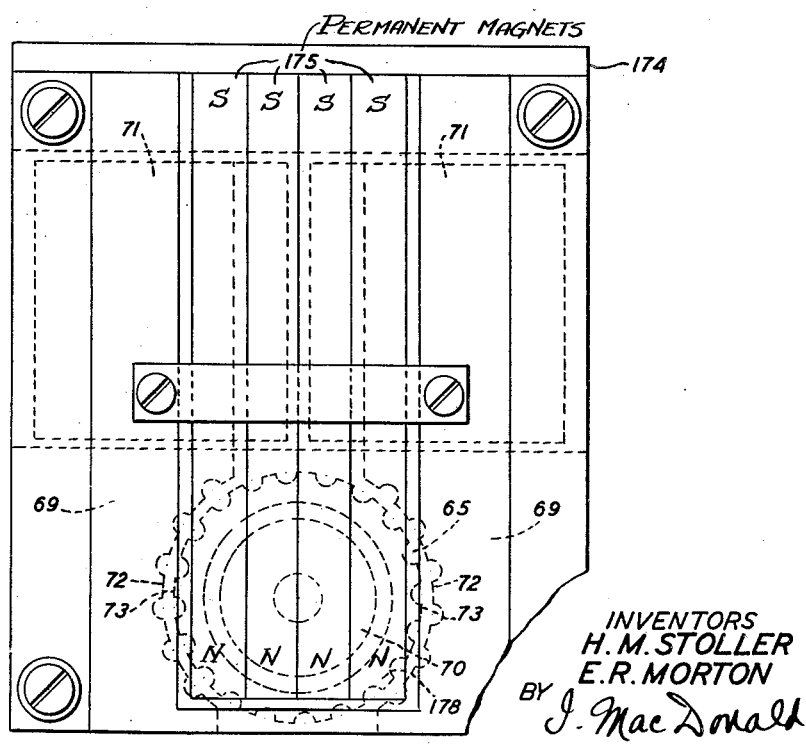
Fig. 3 is an elevational view of the back of the synchronous motor.

The motor 6 is secured to a rectangular frame 74 as shown in Fig. 1 by means of screws 75. The shaft 76 is journalled in a boss 77 of the frame 74 as shown in Fig. 2 and extends outward beyond the flat surface of the frame. Secured to the outer extremity of the shaft 76 is a pinion 78 the teeth of which engage a comparatively large gear 79, shown in Fig. 1 which, as will be subsequently described, serves to drive a clutch member.

Secured to the outer flat face of the rectangular frame 74 by means of the screws 80 is an L-shaped bracket 81 which terminates at its free end in spaced bosses 82 and 83. Secured within the boss 82 and extending inwardly therefrom toward the flat face of the frame 74 is a pin 84 on which is revolvably supported a comparatively large gear 79 which is permanently engaged by the pinion 78. Secured to the outer face of the large gear 79 by means of the pins 85 is a ratchet wheel 86. The ratchet wheel 86 serves in conjunction with other means to be subsequently described to provide a means for manually rotating the cylindrical rotor 70 of the motor 6.

The frame 74 terminates in one end in a plate portion 87 shown in Fig. 1 as being integral with the frame 74. The plate portion 87 is provided with an elongated arcuately shaped aperture 88 and an elongated straight aperture 89. Journalled in a boss 90 in the plate portion 87 and projecting normal to the plane of the plate portion 87 is a shaft 91. Attached to the outer end of the shaft 91 is a handle 92 which may be manually operated to rotate the shaft 91 when the synchronous motor 6 is to be started. Attached to the center of the shaft 91 and projecting normal to the axis of the shaft 91 is an L-shaped arm 93 the free end of which projects through the elongated arcuately shaped aperture 88 in the plate portion 87. The arm 93 is manually operated by means of the handle 92 against the action of a spring 94, the spring 94 being attached at one end to the arm 93 and having the other end attached to a screw 95 which is adjustable within the elongated straight aperture 89 in the plate portion 87 of the frame 74. Attached to the arm 93 and extending normal therefrom is a pawl 96 the free end of which may be brought into engagement with the ratchet wheel 86. To start the synchronous motor 6, the handle 92 is manually moved toward the right until the free end of the arm 93 reaches the end of the elongated arcuately shaped aperture 88. By this movement the pawl 96 is brought into engagement with the ratchet wheel 86. When the handle 92 is released the spring 94 returns the arm 93 to normal position and in so doing presses the pawl 96 against the teeth of the ratchet wheel 86. The ratchet wheel 86 is therefore driven by the spring-operated pawl 96 until the pawl 96 passes in its arc of movement out of engagement with the ratchet wheel 86. Since the ratchet wheel 86 is pinned to the large gear 79, rotation of the ratchet wheel 86 causes rotation of the large gear 79 and rotation of the pinion 78 which is attached to the shaft 76 extending axially from the cylindrical rotor 70 of the synchronous motor 6. When the synchronous motor 6 has thus been manually started, the rotor 70 is continued in its rotation by the continuously changing current in the operating coils 71.

Adjustably secured within the boss 83 of the L-shaped bracket 81 is a screw 97 which serves as an adjustable bearing for shaft 182. The shaft 182 extends through an aperture in the frame 74 and runs parallel with an arm 109 which is integral with the frame 74. The arm 109 extends backward of the frame 74 and terminates at its free end in an upturned end portion 110. The upturned end portion 110 supports a bearing 111, an adjustment screw 183 and a set screw 184. The shaft 182 is supported at one end by the screw 97 and at the other end by the bearing 111 and may be adjusted longitudinally by means of the screws 97 and 183.

Between the free end of the L-shaped bracket 81 and the frame 74 and supported by the shaft 182 is an annular clutch member 98. The annular clutch member 98 is provided with peripheral teeth 99 forming a gear which is in engagement with the teeth of the large gear 79. The clutch member 98 has a hub portion 100 which is pinned to the shaft 182. The clutch member 98 is provided with clutch teeth on its inner face 101, the teeth being directed axially toward the rectangular frame 74 and having their edges radial with respect to the shaft 182. An annular stop clutch member 102 with teeth corresponding in number and spacing to the teeth on the inner face 101 of the clutch member 98 is secured to the rectangular frame 74 by means of the screws 103. The teeth on the annular stop clutch member 102 extend axially toward the clutch member 98 and have their edges radial to the shaft 182 and are inclined conjugately to the teeth on the inner face 101 of the annular clutch member 98. The annular clutch member 98 and the stop clutch member 102 are spaced apart a sufficient distance to permit a flyer arm clutch member 105 to be operated between them. The flyer arm clutch member 105 is attached to an annular hub 185 which forms one end of a tubular shaft 113. The tubular shaft 113 extends parallel to the arm 109 and encloses the shaft 182 and is provided with internal bearing surfaces in each end. The shaft 182 is normally rotated within the tubular shaft 113 and the tubular shaft 113 may be moved longitudinally along the shaft 182. The flyer arm clutch member 105 is moved from one to the other of the clutch members 98 and 102 by means of the polarized clutch operating magnet 66. The polarized clutch operating magnet 66 is attached to the rectangular frame 74 by means of a bracket 106 and has spaced pole-pieces 107, a permanent bar magnet 186 and operating coils 108 extending parallel to the rectangular frame 74. The tubular shaft 113 extends through bifurcated ends in the pole-pieces 107 and through the center of the annular stop clutch member 102. Between the pole-pieces 107 and attached to the shaft 113 is a cylindrical armature 114 which is attracted toward one or the other of the pole-pieces 107 when the polarized clutch operating magnet 66 is operated. The tubular shaft 113, therefore, is longitudinally moved by operation of the polarized clutch operating magnet 66.

What is claimed is:

1. In an apparatus of the class described a synchronous motor comprising a set of permanent magnets, pole-pieces connected to said magnets, energizing coils on said pole-pieces to vary the magnetic flux, a rotor operating between said pole-pieces and a plug member attached to ends of said permanent magnets and projecting within said rotor said plug member forming part of a magnetic circuit for the motor.

2. In an apparatus of the class described a synchronous motor comprising a set of bar magnets permanently magnetized, U-shaped pole-pieces connected to end portions of said bar magnets, energizing coils on said pole-pieces to vary the magnetic flux, a rotor operating between said pole-pieces, said rotor being hollowed out in the centre and a plug member attached to said bar magnets and projecting into the hollowed out portion of said rotor said plug member forming part of the magnetic circuit of said motor.

HUGH M. STOLLER.
EDMUND R. MORTON.